US007601380B2

(12) United States Patent
Fang et al.

(10) Patent No.: US 7,601,380 B2
(45) Date of Patent: Oct. 13, 2009

(54) BEVERAGE CLOUDING SYSTEM AND METHOD

(75) Inventors: Yuan Fang, Cortlandt Manor, NY (US); John Krulish, Bogota, NJ (US)

(73) Assignee: PepsiCo, Inc., Purchase, NY (US)

( * ) Notice: Subject to any disclaimer, the term of this patent is extended or adjusted under 35 U.S.C. 154(b) by 658 days.

(21) Appl. No.: 11/281,007

(22) Filed: Nov. 17, 2005

(65) Prior Publication Data

US 2007/0110874 A1  May 17, 2007

(51) Int. Cl.
*A23L 2/62* (2006.01)

(52) U.S. Cl. .................. 426/602; 426/573; 426/590; 426/601; 426/604

(58) Field of Classification Search ............ 426/74, 426/620, 615, 640, 639, 658, 573, 590, 601, 426/602, 604
See application file for complete search history.

(56) References Cited

U.S. PATENT DOCUMENTS

| | | | |
|---|---|---|---|
| 4,195,084 A | | 3/1980 | Ong |
| 4,705,691 A | * | 11/1987 | Kupper et al. ............ 426/590 |
| 5,342,643 A | | 8/1994 | Wolf |
| 5,502,045 A | | 3/1996 | Miettinen et al. |
| 5,932,562 A | | 8/1999 | Ostlund, Jr. |
| 6,063,776 A | | 5/2000 | Ostlund, Jr. |
| 6,087,353 A | | 7/2000 | Stewart et al. |
| 6,129,944 A | | 10/2000 | Tiainen et al. |
| 6,200,624 B1 | | 3/2001 | Mazer et al. |
| 6,355,274 B1 | | 3/2002 | Dartey et al. |
| 6,394,230 B1 | | 5/2002 | Milstein et al. |
| 6,423,363 B1 | | 7/2002 | Traska et al. |
| 6,491,952 B1 | | 12/2002 | Sjoberg |
| 6,576,285 B1 | | 6/2003 | Bader et al. |
| 6,623,780 B1 | | 9/2003 | Stevens et al. |
| 6,627,245 B1 | | 9/2003 | Doat et al. |
| 6,677,327 B1 | | 1/2004 | Gottemoller |
| 6,794,375 B2 | | 9/2004 | Sarama et al. |
| 6,835,405 B2 | | 12/2004 | Merkt et al. |
| 6,933,291 B2 | | 8/2005 | Qi et al. |
| 2002/0016317 A1 | | 2/2002 | Schul et al. |
| 2002/0048606 A1 | | 4/2002 | Zawistowski |
| 2002/0064548 A1 | | 5/2002 | Yoon et al. |
| 2003/0104035 A1 | | 6/2003 | Wester et al. |
| 2003/0113361 A1 | * | 6/2003 | Sarama et al. ............ 424/439 |
| 2003/0165572 A1 | | 9/2003 | Auriou |
| 2003/0232118 A1 | | 12/2003 | Lerchenfeld et al. |
| 2004/0029844 A1 | | 2/2004 | Yoon et al. |
| 2004/0067260 A1 | | 4/2004 | Milley et al. |
| 2004/0131657 A1 | | 7/2004 | Wester et al. |
| 2004/0142087 A1 | | 7/2004 | Lerchenfeld et al. |
| 2004/0156887 A1 | | 8/2004 | Auriou |
| 2004/0166224 A1 | | 8/2004 | Mankura et al. |
| 2005/0051419 A1 | | 3/2005 | Zima et al. |
| 2005/0118203 A1 | | 6/2005 | Yoon et al. |
| 2005/0170064 A1 | | 8/2005 | Yoon et al. |
| 2005/0175672 A1 | | 8/2005 | Kluetz et al. |

FOREIGN PATENT DOCUMENTS

| | | |
|---|---|---|
| CA | 2310502 | 12/2000 |
| EP | 0986962 | 3/2000 |
| EP | 1149845 | 10/2001 |
| EP | 1212945 | 6/2002 |
| EP | 1298194 | 4/2003 |
| SU | 1597156 A1 | 10/1990 |
| WO | WO 9308704 | 5/1993 |
| WO | 99/15547 | 4/1999 |
| WO | 99/44442 | 9/1999 |
| WO | 99/53925 | 10/1999 |
| WO | 99/63841 | 12/1999 |
| WO | 00/41491 | 7/2000 |
| WO | 00/45648 | 8/2000 |
| WO | 03/105611 A2 | 12/2003 |
| WO | 2004/093571 | 11/2004 |

* cited by examiner

*Primary Examiner*—Helen F Pratt
(74) *Attorney, Agent, or Firm*—Banner & Witcoff, Ltd.

(57) ABSTRACT

A beverage clouding system composition that comprises a sterol ester, stanol ester, or combinations thereof, an oil and a continuous aqueous phase is provided. Additionally, compositions of a finished cloudy beverage and a cloudy beverage syrup each incorporating the beverage clouding system according to the present invention are provided. Methods of making the same are also provided.

20 Claims, No Drawings

BEVERAGE CLOUDING SYSTEM AND METHOD

FIELD OF THE INVENTION

The present invention relates to a beverage clouding system. More particularly, the present invention relates to a beverage clouding system, a beverage concentrate having a clouding system, a resulting beverage, and various methods.

BACKGROUND OF THE INVENTION

Various types of beverages are known. Some beverages, such as water and colas, have relatively low turbidity giving them a transparent or clear appearance. Other beverages such as juices have relatively higher turbidity and thus have an opaque appearance.

Often, it is desired that the beverage have a relatively high turbidity. The turbidity of such beverages can be increased by the use of a clouding system.

A need exists for a beverage clouding system that results in a cloudy beverage, the taste of which is not adversely affected by the addition of the clouding system. In addition, it would be desirable for the clouding system to provide one or more beneficial properties to the beverage in addition to the clouding property.

SUMMARY OF THE INVENTION

In accordance with the present invention, a beverage clouding system is provided. The beverage clouding system comprises a suitable emulsifier, a hydrophobic clouding agent, an oil, and optionally, a suitable weighting agent. The clouding system can be readily incorporated into either an unclouded beverage concentrate, an unclouded beverage syrup, an unclouded beverage, or a low clouded flavor concentrate. Such incorporation into a beverage concentrate, beverage syrup, or beverage can be done by blending the clouding system with the concentrate, the syrup, or the beverage.

The hydrophobic clouding agent can be selected from sterol esters, stanol esters, and combinations thereof. The hydrophobic clouding agent can be present in a desired amount, typically in an amount from about 1% to about 32% by weight of the total beverage clouding system. The oil can be present in a desired amount, typically in an amount from about 2% to about 24% by weight of the total beverage clouding system, and the optional, suitable weighting agent can be present in an amount less than about 16% by weight of the total beverage clouding system.

Suitable emulsifiers can be selected from gum arabic, modified starch, pectin, xanthan gum, guar gum, propylene glycol alginate, and combinations thereof. The emulsifier typically can be present in an amount from about 1% to about 30% by weight of the total beverage clouding system. Suitable weighting agents can be selected from ester gum, sucrose acetate isobutyrate (SAIB), and combinations thereof.

The beverage clouding system can further comprise a suitable co-emulsifier. Suitable co-emulsifiers can be selected from monoglycerides, diglycerides, sugar esters, lecithin, dioctyl sulfosuccinate sodium (DOSS), polyoxyethylene (20) sorbitan monolaurate (Tween® 20), polyoxyethylene (20) sorbitan monopalmitate (Tween® 40), polyoxyethylene (20) sorbitan monostearate (Tween® 60), polyoxyethylene (20) sorbitan monooleate (Tween® 80), sorbitan monolaurate (Span® 20), sorbitan monopalmitate (Span® 40), betaine, and combinations thereof.

In one embodiment, the oil can be a flavorless oil. In another embodiment, the oil can be a flavor oil.

In accordance with another aspect of the present invention, a method of producing a beverage clouding system is provided.

The method comprises providing oil phase components, blending the oil phase components at a temperature less than about 40° C., preferably at ambient room-temperature which is typically about 21° C. In particular, the oil phase components are blended without applying any external heat. Additionally, the method includes providing aqueous phase components, and dispersing the oil phase components in the aqueous phase components under agitation or high shear mixing to form a pre-emulsion. The oil phase components can be present in a desired amount, typically in an amount from about 3% to about 40% by weight of the total beverage clouding system.

The oil phase components comprise a hydrophobic clouding agent selected from sterol esters, stanol esters, and combinations thereof, an oil, and optionally, a weighting agent. The hydrophobic clouding agent is typically present in an amount from about 1% to about 32% by weight of the total beverage clouding system. The oil is typically present in an amount from about 2% to about 24% by weight of the total beverage clouding system, and the optional weighting agent is typically present in an amount less than about 16% by weight of the total beverage clouding system.

In one embodiment of the present invention, the method further comprises incorporating a suitable emulsifier into the beverage clouding system. The emulsifier is typically present in an amount from about 1% to about 30% by weight of the total beverage clouding system.

In another embodiment of the present invention, the method further comprises homogenizing the pre-emulsion to produce a uniformly dispersed fine emulsion. This may be done at a suitable pressure, such as from about 2000 psi to about 6000 psi, preferably from about 3000 psi to about 4000 psi.

In accordance with yet another aspect of the present invention a cloudy beverage is provided. The cloudy beverage may comprise a beverage clouding system as described previously and an edible liquid selected from ready-to-drink beverages. The concentration of the clouding agent in the beverage composition will be in an amount sufficient to achieve the desired degree of turbidity or cloudiness. Typically, the clouding agent in the beverage composition is from about 30 ppm to about 1000 ppm by weight, preferably from about 100 ppm to about 200 ppm by weight.

The ready-to-drink beverage containing the inventive clouding system can be suitable juices, teas, coffees, nonalcoholic drinks, carbonated drinks, noncarbonated drinks, and combinations thereof.

In accordance with yet another aspect of the present invention, a method of producing a cloudy beverage is provided. The method comprises making a beverage clouding system as previously described and incorporating it into a beverage.

In accordance with another aspect of the present invention, a cloudy beverage syrup is provided.

The cloudy beverage syrup comprises a beverage syrup and a beverage clouding system as previously described. The concentration of the clouding agent in the cloudy beverage syrup will be in an amount sufficient to achieve the desired degree of turbidity or cloudiness in a finished cloudy beverage composition. Typically, the concentration of the clouding agent in a finished cloudy beverage composition is from about 30 ppm to about 1000 ppm by weight, preferably from about 100 ppm to about 200 ppm by weight.

In one embodiment, the beverage syrup can be a blend of sweeteners, acidulants, preservatives, flavor extracts, flavor emulsions, and combinations thereof.

In accordance with another aspect of the present invention, a method of producing a cloudy beverage syrup is provided that comprises making a beverage clouding system in accordance with the present invention and incorporating the beverage clouding system into a beverage syrup.

DETAILED DESCRIPTION OF THE INVENTION

In accordance with one aspect of the present invention, a beverage clouding system is provided. The beverage clouding system is useful to provide a desired degree of cloudiness to the beverage and comprises a suitable emulsifier, a hydrophobic clouding agent, an oil, and optionally, a suitable weighting agent.

The hydrophobic clouding agent can be selected from sterol esters, stanol esters, and combinations thereof. The hydrophobic clouding agent can be present in a desired amount, typically in an amount from about 1% to about 32% by weight of the total beverage clouding system. The oil can be present in a desired amount, typically in an amount from about 2% to about 24% by weight of the total beverage clouding system, and the optional suitable weighting agent can be present in an amount less than about 16% by weight of the total beverage clouding system.

Sterol and stanol esters, in addition to providing the cloudiness, have been shown to provide health benefits such as reducing low-density lipoprotein (LDL) cholesterol levels in humans when consumed in amounts of about 1.3 grams per day on a regular basis. The sterol and stanol esters are the esterified forms of the free sterols and stanols respectively. Stanols are the saturated or hydrogenated form of the sterols or plant sterols.

Plant sterols can be derived from vegetable oils or tall oil. Common sources of sterols from vegetable oils include, but are not limited to, coconut oil, corn oil, cotton oil, olive oil, palm oil, peanut oil, rapeseed oil, canola oil, safflower oil, linseed oil, cotton seed oil, soybean oil, sunflower oil, walnut oil, and avocado oil. Additionally, sterols can be derived from tall oil. Tall oil can be obtained from the wood of coniferous plants.

Stanols in the free and esterified forms and esterified sterols are not as readily available from natural sources as the free sterols. Thus, the free sterols must be hydrogenated to produce free stanols; and the free sterols and stanols must be esterified to produce sterol esters and stanol esters. Suitable sterols and stanols in esterified forms are commercially available from Raisio Benecol and McNeil Nutritionals, under the trade name Benecol®, from Archer Daniels Midland under the trade name CardioAid®, from Cognis under the trade name VegaPure®, from MultiBene Group under the trade name MultiBene® and others as known in the art.

The oil used in accordance with the present invention should be suitable for use in beverages and for consumption by humans and includes, but is not limited to, flavorless oils, flavor oils, and combinations thereof.

In one embodiment, a flavor neutral beverage clouding system is provided by using a flavorless oil. Non-limiting examples of flavorless oils include medium chain triglycerides, vegetable oils, grapeseed oil, and the like, as is known to those skilled in the art. Non-limiting examples of suitable vegetable oils include soybeans, palm, rapeseed, sunflower seed, peanut, cotton seed, olive, avocado, coconut, safflower, other vegetable oils as is known to those skilled in the art, and combinations thereof. The term "flavor neutral" as used herein means that the taste or flavor of the beverage is not adversely affected by the addition of the beverage clouding system.

In another embodiment, a flavor clouding system is provided by using a flavor oil. Non-limiting examples of flavor oils include citrus oils, cola oils, essential oils, and the like, as is known in the art. Non-limiting examples of essential oils include almond, grapefruit, cinnamon, lemon, lime, orange, peppermint, tangerine, other essential oils as is known to those skilled in the art, and combinations thereof.

The weighting agent can be any suitable weighting agent for use in beverages and for consumption by humans. Non-limiting examples of suitable weighting agents include ester gums, sucrose acetate isobutyrate (SAIB), other weighting agents as is known to those skilled in the art, and combinations thereof.

The emulsifier used in accordance with the present invention should be suitable for use in beverages and for consumption by humans and can be present in a desired amount, typically in an amount from about 1%, to about 30% by weight of the total beverage clouding system.

Non-limiting examples of suitable emulsifiers include gum arabic, modified starch, pectin, xanthan gum, guar gum, propylene glycol alginate, monoglyceride, diglyceride, dioctyl sulfosuccinate sodium (DOSS), polyoxyethylene (20) sorbitan monolaurate (Tween® 20), polyoxyethylene (20) sorbitan monopalmitate (Tween® 40), polyoxyethylene (20) sorbitan monostearate (Tween® 60), polyoxyethylene (20) sorbitan monooleate (Tween® 80), sorbitan monolaurate (Span® 20), sorbitan monopalmitate (Span® 40), betaine, other emulsifiers as is known to those skilled in the art, and combinations thereof. Preferably, the emulsifier is selected from the group consisting of gum arabic, modified starch, pectin, xanthan gum, guar gum, propylene glycol alginate, and combinations thereof.

In one embodiment, the beverage clouding system further comprises a suitable co-emulsifier present in a desired amount to enhance the stability of the beverage. Preferably, the co-emulsifier is selected from the group consisting of monoglyceride, diglyceride, dioctyl sulfosuccinate sodium (DOSS), polyoxyethylene (20) sorbitan monolaurate (Tween® 20), polyoxyethylene (20) sorbitan monopalmitate (Tween® 40), polyoxyethylene (20) sorbitan monostearate (Tween® 60), polyoxyethylene (20) sorbitan monooleate (Tween® 80), sorbitan monolaurate (Span® 20), sorbitan monopalmitate (Span® 40), betaine, and combinations thereof.

In another aspect of the present invention, a method for preparing a beverage clouding system is provided. The method comprises providing oil phase components, blending the oil phase components at a temperature less than about 40° C., preferably at ambient room temperature which is typically about 21° C. In particular, the oil phase components are blended without applying any external heat to the oil components. In addition, the method includes providing aqueous phase components, and dispersing the oil phase components in the aqueous phase components under agitation or high shear mixing to produce a pre-emulsion. The oil phase components can be present in a desired amount, typically in an amount from about 3% to. about 40% by weight of the total beverage clouding system.

The oil phase components comprise a hydrophobic clouding agent selected from sterol esters, stanol esters, and combinations thereof, an oil, and, optionally, a weighting agent. The hydrophobic clouding agent is typically present in an amount from about 1% to about 32% by weight of the total beverage clouding system. The oil can be present in an amount from about 2% to about 24% by weight of the total beverage clouding system, and the optional weighting agent can be present in an amount less than about 16% by weight of the total beverage clouding system.

In one embodiment of the present invention, the method further comprises incorporating an emulsifier into the beverage clouding system. Typically, the emulsifier is present in an amount from about 1% to about 30% by weight of the total beverage clouding system.

In another embodiment of the present invention, the method further comprises homogenizing the pre-emulsion at a pressure from about 2000 psi to about 6000 psi, preferably from about 3000 psi to about 4000 psi, to produce a uniformly dispersed fine emulsion.

The term pre-emulsion as used herein means an emulsion wherein the hydrophobic clouding agent has a mean particle size from about 5 microns to about 20 microns and the oil phase components are slightly uniformly dispersed.

The term fine emulsion as used herein means an emulsion wherein the hydrophobic clouding agent has a mean particle size from about 0.3 microns to about 1.5 microns, preferably from about 0.5 microns to about 0.8 microns, and a particle size distribution from about 0.03 microns to about 5.0 microns, preferably from about 0.1 microns to about 2.0 microns.

In one embodiment, a flavor neutral beverage clouding system is provided by using a flavorless oil. In another embodiment, a flavor clouding system is provided by using a flavor oil.

High shear mixing can be performed by any suitable mixer known to those skilled in the art. Non-limiting examples of suitable mixers include turbine agitators, static mixers, and other high shear mixers known to those skilled in the art. Turbine agitators are commercially available from Scott Turbon® Mixer, Inc., Adelanto, Calif., and others as is known in the art. Static mixers, sometimes known in the art as motionless mixers or in-line mixers, come in various sizes and geometries and are commercially available from Chemineer Inc., Dayton, Ohio, Sulzer Chemtech Ltd., a member of the Sulzer Corp., Winterthur, Switzerland, Charles Ross & Son Co., Hauppauge, N.Y., and others as is known in the art.

In accordance with yet another aspect of the present invention a cloudy beverage is provided. The cloudy beverage comprises a beverage clouding system as described previously in accordance with the present invention and an edible liquid selected from ready-to-drink beverages. The edible liquid is typically an aqueous composition with significantly low turbidity.

Non-limiting examples of ready-to-drink beverages include juices, teas, coffees, nonalcoholic drinks, carbonated drinks, noncarbonated drinks, and combinations thereof.

The clouding agent is present in the beverage in an amount sufficient to achieve the desired degree of turbidity. A higher concentration of the clouding agent present in the beverage results in a more cloudy beverage. Conversely, a lower concentration of the clouding agent present in the beverage results in a less cloudy beverage. As used herein, the terms cloudy, cloudiness, and variations thereof when used to describe a beverage mean a beverage containing a readily visible degree of turbidity.

In the present invention, the amount of clouding agent present in the beverage to achieve the desired degree of turbidity is from about 30 ppm to about 1000 ppm by weight, preferably from about 100 ppm to about 200 ppm by weight.

Those skilled in the art will appreciate that as the concentration of the clouding agent increases, the degree of turbidity increases at a marginally decreasing rate. Thus, increasing the concentration of the clouding agent may result in a higher concentration of the clouding agent in the beverage without any observable increase in the turbidity of the beverage. In the present invention, however, increasing the concentration of the clouding agent in the beverage may be desirable to provide beneficial health properties to the beverage.

In accordance with yet another aspect of the present invention, a method of producing a cloudy beverage is provided. The method comprises making a beverage clouding system as previously described in accordance with the present invention and combining the beverage clouding system with an edible liquid.

In accordance with another aspect of the present invention, a cloudy beverage syrup is provided. The cloudy beverage syrup comprises a beverage syrup and a beverage clouding system as previously described in accordance with the present invention. The concentration of the clouding agent in the cloudy beverage syrup will be in an amount sufficient to achieve the desired degree of turbidity or cloudiness in a finished cloudy beverage composition. It will be apparent to those skilled in the art that to form a finished cloudy beverage the beverage syrup is further diluted with a diluent such as water or any other suitable aqueous medium. Typically, the dilution rate of the beverage syrup to diluent is 1 part syrup concentrate to 4 or 5 parts of diluent.

The beverage syrup is typically an aqueous composition with significantly low turbidity. In one embodiment, the beverage syrup is composed of sweeteners, acidulants, preservatives, flavor extracts, and flavor emulsions.

In accordance with another aspect of the present invention, a method of producing a cloudy beverage concentrate is provided. The method comprises making a beverage clouding system as previously described in accordance with the present invention and combining the beverage clouding system with a beverage syrup.

Those skilled in the art will appreciate that the beverage clouding system according to the present invention can be incorporated into a beverage at any suitable stage of the beverage manufacturing process. For example, the beverage clouding system can be added in the final step of a finished beverage. Alternatively, the beverage clouding system can be added earlier in the process such as when the beverage concentrate is prepared or at a later stage such as when the beverage syrup is prepared. Thus, a skilled artisan can determine the stage at which to add the beverage clouding system of the present invention that is best suited for a particular beverage.

EXAMPLES

Examples 1 through 4 below were prepared using the following process. Ingredients V and IV were blended at ambient room temperature, about 21° C., without applying any external heat to prepare an oil phase. Ingredients I, II, III, and VI were blended, also at ambient room temperature, to prepare an aqueous phase. Then, the oil phase was dispersed into the aqueous phase under high shear mixing to form a pre-emulsion. The high shear mixer used in the preparation of these examples was a Silverson Lab Mixer. The pre-emulsion was then homogenized in an APV Homogenizer operating at 4,000 psi to produce a uniformly dispersed fine emulsion.

Example No. 1

| I. | Sodium Benzoate | 0.979 grams(g) |
|---|---|---|
| II. | Ascorbic Acid | 0.576 g |
| III. | Citric Acid | 1.499 g |
| IV. | Gum Arabic | 162 g |
| V. | Weighted Oil (50% sterol ester and 50% neobee oil) | 90 g |
| VI. | Water | to 1 liter |

Example No. 2

| I. | Sodium Benzoate | 0.979 grams(g) |
|---|---|---|
| II. | Ascorbic Acid | 0.576 g |
| III. | Citric Acid | 1.499 g |
| IV. | Purity Gum | 135 g |
| V. | Weighted Oil (50% sterol ester and 50% neobee oil) | 90 g |
| VI. | Water | to 1 liter |

Example No. 3

| I. | Sodium Benzoate | 0.979 grams(g) |
|---|---|---|
| II. | Ascorbic Acid | 0.576 g |
| III. | Citric Acid | 1.499 g |
| IV. | Gum Arabic | 162 g |
| V. | Weighted Oil (50% sterol ester, 40% neobee oil, and 10% ester gum) | 90 g |
| VI. | Water | to 1 liter |

Example No. 4

| I. | Sodium Benzoate | 0.979 grams(g) |
|---|---|---|
| II. | Ascorbic Acid | 0.576 g |
| III. | Citric Acid | 1.499 g |
| IV. | Gum Arabic | 162 g |
| V. | Weighted Oil (50% sterol ester, 20% neobee oil, and 30% SAIB) | 90 g |
| VI. | Water | to 1 liter |

While the invention has been described with respect to certain preferred embodiments, as will be appreciated by those skilled in the art, it is to be understood that the invention is capable of numerous changes, modifications and rearrangements. and such changes, modifications and rearrangements are intended to be covered by the following claims.

The invention claimed is:

1. A beverage clouding composition consisting essentially of:
   an emulsifier in an amount from about 1% to about 30% by weight of the total beverage clouding composition;
   a hydrophobic clouding agent selected from the group consisting of sterol esters, stanol esters, and combinations thereof, the hydrophobic clouding agent present in an amount from about 1% to about 32% by weight of the total beverage clouding composition;
   an oil in an amount from about 2% to about 24% by weight of the total beverage clouding composition;
   optionally, a weighting agent in an amount less than about 16% by weight of the total beverage clouding composition; and
   the hydrophobic clouding agent, the oil, and the optional weighting agent present in an amount from about 3% to about 40% by weight of the total beverage clouding composition.

2. The beverage clouding composition of claim 1 wherein the emulsifier is selected from the group consisting of gum arabic, modified starch, pectin, xanthan gum, guar gum, propylene glycol alginate, and combinations thereof, the emulsifier present in an amount from about 1% to about 30% by weight of the total beverage clouding composition.

3. The beverage clouding composition of claim 1 further comprising a co-emulsifier selected from the group consisting of monoglycerides, diglycerides, sugar esters, lecithin, dioctyl sulfosuccinate sodium, polyoxyethylene (20) sorbitan monolaurate, polyoxyethylene (20) sorbitan monopalmitate, polyoxyethylene (20) sorbitan monostearate, polyoxyethylene (20) sorbitan monooleate, sorbitan monolaurate, sorbitan monopalmitate, betaine, and combinations thereof.

4. The beverage clouding composition of claim 1 wherein the oil is a flavorless oil.

5. The beverage clouding composition of claim 1 wherein the oil is a flavor oil.

6. The beverage clouding composition of claim 1 wherein the weighting agent is selected from the group consisting of ester gum, sucrose acetate isobutyrate, and combinations thereof.

7. A method for preparing a beverage clouding composition consisting essentially of:
   providing oil phase components comprising a hydrophobic clouding agent selected from the group consisting of sterol esters, stanol esters and combinations thereof, the hydrophobic clouding agent present in an amount from about 1% to about 32% by weight of the total beverage clouding composition, an oil in an amount from about 2% to about 24% by weight of the total beverage clouding composition, and optionally, a weighting agent in an amount less than about 16% by weight of the total beverage clouding composition;
   blending the oil phase components at a temperature less than about 40° C.;
   providing aqueous phase components comprising water; and
   dispersing the oil phase components in the aqueous phase components under agitation or high shear mixing to produce a pre-emulsion wherein the oil phase components are present in an amount from about 3% to about 40% by weight of the total beverage clouding composition.

8. The method of claim 7 further comprising incorporating an emulsifier into the beverage clouding system in an amount from about 1% to about 30% by weight of the total beverage clouding system.

9. The method of claim 8 wherein the emulsifier is selected from the group consisting of gum arabic, modified starch, pectin, xanthan gum, guar gum, propylene glycol alginate, and combinations thereof.

10. The method of claim 7 further comprising homogenizing the pre-emulsion at a pressure from about 2000 psi to about 6000 psi to produce a uniformly dispersed fine emulsion.

11. The method of claim 7 wherein the high shear mixing is performed by a mixer selected from the group consisting of turbine agitators and static mixers.

12. A cloudy beverage comprising:
a beverage clouding composition consisting essentially of an emulsifier in an amount from about 1% to about 30% by weight of the total beverage clouding composition; a hydrophobic clouding agent selected from the group consisting of sterol esters, stanol esters, and combinations thereof, the hydrophobic clouding agent present in an amount from about 1% to about 32% by weight of the total beverage clouding composition; an oil in an amount from about 2% to about 24% by weight of the total beverage clouding composition; and optionally, a weighting agent in an amount less than about 16% by weight of the total beverage clouding composition wherein the hydrophobic clouding agent, the oil, and the optional weighting agent are present in an amount from about 5% to about 40% by weight of the total beverage clouding composition; and
an edible liquid selected from ready-to-drink beverages;
wherein the concentration of the clouding agent in the cloudy beverage is from about 30 ppm to about 1000 ppm by weight.

13. The beverage of claim 12 wherein the emulsifier is selected from the group consisting of gum arabic, modified starch, pectin, xanthan gum, guar gum, propylene glycol alginate, and combinations thereof, the emulsifier present in an amount from about 1% to about 30% by weight of the total beverage clouding composition.

14. The beverage of claim 12 wherein the ready-to-drink beverage is selected from the group consisting of juices, teas, coffees, nonalcoholic drinks, carbonated drinks, noncarbonated drinks, and combinations thereof.

15. A method for preparing a cloudy beverage comprising:
providing oil phase components consisting essentially of a hydrophobic clouding agent selected from the group consisting of sterol esters, stanol esters and combinations thereof, the hydrophobic clouding agent present in an amount from about 1% to about 32% by weight of the total oil phase components, an oil in an amount from about 2% to about 24% by weight of the total oil phase components, and optionally, a weighting agent in an amount less than about 16% by weight of the total oil phase components;
blending the oil phase components at a temperature less than about 25° C.;
providing aqueous phase components comprising water;
dispersing the oil phase components in the aqueous phase components under agitation or high shear mixing to produce a pre-emulsion wherein the oil phase components are present in an amount from about 5% to about 40% by weight of the pre-emulsion; and
combining the pre-emulsion with an edible liquid selected from ready-to-drink beverages;
wherein the concentration of the clouding agent in the cloudy beverage is from about 30 ppm to about 1000 ppm by weight.

16. The method of claim 15 further comprising homogenizing the pre-emulsion at a pressure from about 2000 psi to about 6000 psi to produce a uniformly dispersed fine emulsion.

17. The method of claim 15 wherein the high shear mixing is performed by a mixer selected from the group consisting of turbine agitators and static mixers.

18. The method of claim 15 wherein the ready-to-drink beverage is selected from the group consisting of juices, teas, coffees, nonalcoholic drinks, carbonated drinks, noncarbonated drinks, and combinations thereof.

19. A cloudy beverage syrup composition comprising:
a beverage clouding composition consisting essentially of an emulsifier in an amount from about 1% to about 30% by weight of the total beverage clouding system; a hydrophobic clouding agent selected from the group consisting of sterol esters, stanol esters, and combinations thereof, the hydrophobic clouding agent present in an amount from about 1% to about 32% by weight of the total beverage clouding composition; an oil in an amount from about 2% to about 24% by weight of the total beverage clouding composition; and optionally, a weighting agent in an amount less than about 16% by weight of the total beverage clouding composition wherein the hydrophobic clouding agent, the oil, and the optional weighting agent are present in an amount from about 5% to about 40% by weight of the total beverage clouding composition; and
a beverage syrup;
wherein the concentration of the clouding agent in a finished cloudy beverage composition is from about 30 ppm to about 1000 ppm by weight.

20. The cloudy beverage syrup of claim 19 wherein the beverage syrup is composed of sweeteners, acidulants, preservatives, flavor extracts, and flavor emulsions.

* * * * *

UNITED STATES PATENT AND TRADEMARK OFFICE
CERTIFICATE OF CORRECTION

PATENT NO.       : 7,601,380 B2                                  Page 1 of 1
APPLICATION NO.  : 11/281007
DATED            : October 13, 2009
INVENTOR(S)      : Fang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 988 days.

Signed and Sealed this

Fifth Day of October, 2010

David J. Kappos
*Director of the United States Patent and Trademark Office*